United States Patent
Ohbayashi

(10) Patent No.: US 7,917,408 B2
(45) Date of Patent: Mar. 29, 2011

(54) PARCEL TRACING SYSTEM, PARCEL TRACING METHOD AND PROGRAM

(75) Inventor: Tetsuo Ohbayashi, Bunkyo (JP)

(73) Assignee: Fujitsu Limited, Kawasaki (JP)

( * ) Notice: Subject to any disclaimer, the term of this patent is extended or adjusted under 35 U.S.C. 154(b) by 1403 days.

(21) Appl. No.: 10/963,854

(22) Filed: Oct. 13, 2004

(65) Prior Publication Data

US 2005/0288818 A1 Dec. 29, 2005

(30) Foreign Application Priority Data

Jun. 7, 2004 (JP) ................................ 2004-168280

(51) Int. Cl.
*G06Q 10/00* (2006.01)
*G06K 15/00* (2006.01)
(52) U.S. Cl. .......................................... 705/28; 235/383
(58) Field of Classification Search ................... 235/383
See application file for complete search history.

(56) References Cited

U.S. PATENT DOCUMENTS 7,118,034 B2 * 10/2006 Baldassari et al. ............ 235/383

FOREIGN PATENT DOCUMENTS

| JP | 2002-169879 | 6/2002 |
| JP | 2004-26407 | 1/2004 |

* cited by examiner

*Primary Examiner* — F. Ryan Zeender
*Assistant Examiner* — Denisse Ortiz Roman
(74) *Attorney, Agent, or Firm* — Greer, Burns & Crain, Ltd.

(57) ABSTRACT

The parcel distribution system attaches a radio tag into which the identification information of the parcel is written to the parcel, and arranges radio tag readers/writers having an internet communication function arranged on the distribution route. The arrival scheduling unit of the server prepares and holds a scheduled passage date when the parcel arrives at the tag communicable areas of the radio tag readers/writers arranged on the distribution route. The parcel retrieving unit instructs the radio tag reader having the scheduled arrival date corresponding to the current date to read the radio tag with reference to the scheduled arrival date held by the arrival scheduling unit, determines the identification information of the traced parcel from the result of the read of the radio tag retrieved from the radio tag reader, and responds with the current position of the parcel.

5 Claims, 18 Drawing Sheets

FIG. 5

| TAG NO. 68 | MERCHANDISE ID 70 | CLIENT INFORMATION 72 | DESTINATION INFORMATION 74 | SPECIFIED ARRIVAL DATE AND TIME 76 | ...... |
|---|---|---|---|---|---|
| IC001 | B01 | ADDRESS, NAME, TEL... | ADDRESS, NAME, TEL... | 200405021500 | |
| | | | | | |

| 70 MERCHANDISE ID | 72 CLIENT INFORMATION | 74 DESTINATION INFORMATION | 78 DATE OF RECEPTION |
|---|---|---|---|
| B01 | ADDRESS, NAME, TEL... | ADDRESS, NAME, TEL... | 200404300900 |

30

| 76 SPECIFIED ARRIVAL DATE AND TIME | 80 ARRIVAL COMPLETION DATE AND TIME | 82 PASSWORD |
|---|---|---|
| 200405021500 | | **** |

FIG. 7

| PARCEL ID 70 | DELIVERY CAR NO. 84 | 32 STARTING DATA AND TIME 86 | ROUTE NO. 88 | ..... |
|---|---|---|---|---|
| B01 | TR55 | 200405010930 | 1 | |

FIG. 8

| ROUTE NO. 88 | READER/WRITER NO. 90 | TIME DIFFERENCE FROM PRECEDING READER/WRITER 92 | COMMUNICATION ADDRESS 94 | LOCATION INFORMATION 96 | ...... |
|---|---|---|---|---|---|
| 1 | 9001 | 30MIN | ...... | ...... | |
| 1 | 9002 | 60MIN | | | |
| .. | .. | | | | |
| 2 | 9010 | 60MIN | | | |
| .. | .. | | | | |

| PARCEL ID 70-1 | ROUTE NO. 88-1 | READER/WRITER NO. 90-1 | ARRIVAL SCHEDULE DATA AND TIME 98-1 | ...... |
|---|---|---|---|---|
| B01 | 1 | 9001 | 200405011000 | |
| | | 9002 | 200405011100 | |
| | | ... | | |

FIG. 9B

| PARCEL ID 70-2 | ROUTE NO. 88-2 | READER/WRITER NO. 90-2 | ARRIVAL SCHEDULE DATA AND TIME 98-2 | ...... |
|---|---|---|---|---|
| B02 | 2 | 9010 | 200405011330 | |
| | | 9025 | 200405011400 | |
| | | ... | | |

PARCEL TRACING SYSTEM, PARCEL TRACING METHOD AND PROGRAM

BACKGROUND OF THE INVENTION

1. Field of the Invention

The present invention relates to a parcel tracing system, a parcel tracing method and program which retrieve the current position of a parcel in distribution by attaching a radio IC tag. More particularly, the present invention relates to a parcel training system, a parcel tracing method and program which retrieve the current position of a parcel in distribution by acquiring information about a radio IC tag through access via the internet.

2. Description of the Related Art

In a conventional distribution system such as a door-to-door trucking service system, a pickup operator receives parcels from clients or agents to collect the received parcels at a cargo collecting center, where the parcels are sorted out and inspected. If the destination is within the same distribution area as the pickup area, the parcel is transferred to a distribution center. After carrying out a shipping operation and storing the parcel in a warehouse, the parcel is paid out from the warehouse for example on the following day and is transferred on a distribution truck to the destination for delivery service.

If the destination is a distant location, parcels for the same destination are gathered in a departure base of the location from the pickup center. The parcels are loaded on a working truck in the night, and transported through expressways to the arrival base of the destination. The parcels are then sent from the arrival base to a distribution center controlling the destination to store the same in a warehouse. Then, on the following day, the parcels are issued from the warehouse of the distribution center, and transferred to the destination on a distribution truck for delivery.

In such a parcel distribution system, regarding the distribution route from receipt of a parcel to the delivery thereof at the place of destination, for each of the operating locations including pickup, issue from warehouse and hauling, data such as slip numbers attached to parcels are read out and stored. When a parcel tracing request is received from a client, parcel tracing service of retrieving the current position of the parcel and notifying the same is provided by checking the stored data.

More recently, there has been proposed a system of filling a radio IC tag attached to the parcel in place of the slip with slip information, reading out the radio IC tag of the parcel by means of a reader/writer device installed at a route base through which the parcel passes on the distribution route, storing the read data as control data, and using the data for parcel tracing service.

[Patent Document 1] Japanese Unexamined Patent Application Publication No. 2002-169879

[Patent Document 2] Japanese Unexamined Patent application Publication No. 2004-026407

However, the conventional parcel tracing service has a problem in that it takes too much time from the receipt of a parcel tracing request from a client to sending a response of the result thereof. This is attributable to the conventional parcel tracing service in which, upon receipt of an inquiry by telephone from the client, a person in charge confirms the slip No., and retrieves the current position of the parcel through retrieval operation of stored data for each of a plurality of route bases including a pickup center, a departure base, a service operator, an arrival base, a distribution center, and a distribution Even for a single route base, there are a plurality of operating locations including arrival, sorting and loading of parcels, and it is necessary to perform retrieving operation of database for each of these operating locations. It takes therefore a time of about half a day from request to a notice of a the result of retrieval, and this imposes a heavy operational load on the person in charge.

SUMMARY OF THE INVENTION

It is an object of the present invention to provide a parcel tracing system, parcel tracing method and program which rapidly retrieve the current position of a parcel on a distribution route and rapidly returns the result of the retrieval.

The present invention provides a parcel tracing system. The parcel tracing system of the present invention comprises a radio tag which is attached to a parcel and into which identification information of the parcel is written; a radio tag reader (radio tag reader/writer) which is arranged on a distribution route and has an internet communication function; an arrival scheduling unit which prepares scheduled arrival date and holds the same in a tag communicable area of the radio tag reader arranged on the distribution route; and a parcel retrieving unit which instructs the radio tag reader having the scheduled arrival date corresponding to the current date with reference to the scheduled arrival date held by the arrival scheduling unit to read out the radio tag upon receipt of a parcel tracing request, and responds the current position of the parcel by determining identification information of the traced parcel from the result of read of the radio tag returned from the radio tag reader.

In this parcel tracing system, the parcel retrieving unit instructs the plurality of radio tag readers having a scheduled arrival date within a time range obtained by adding or subtracting a prescribed time to or from the current date upon receipt of a tracing request to read the radio tag, thereby determining the identification information of the traced parcel from the result of read.

The parcel retrieving unit may instruct the radio tag readers having a scheduled arrival date the closest to the current date when the tracing request is received to read the radio tag, thereby determining the identification information of the traced parcel from the result of read.

In addition, the parcel retrieving unit may select a plurality of radio tag reader having past scheduled arrival dates close to the current date for which a tracing request is received in the order of closer to more distant ones to instruct them to read out the radio tag, thereby determining the identification information of the traced parcel from the result of read.

When the identification information of the traced parcel cannot be determined from the result of read of the radio tag reader, the parcel retrieving unit instructs the radio tag reader having an earlier scheduled arrival time to read the radio tag, thereby determining the identification information of the traced parcel.

The parcel tracing system of another embodiment of the present invention comprises a radio tag which is attached to a parcel and into which identification information of the parcel is written; a radio tag which is arranged on a distribution route, and upon arrival of the parcel to which the radio tag is attached has an internet communication function of reading out the identification information of the parcel and storing the same, with reference to the scheduled arrival date held by an arrival scheduling unit; the arrival scheduling unit which prepares and holds a scheduled arrival date when the parcel arrives at a tag communicable area of the radio tag reader installed on the distribution route; and a parcel retrieving unit which, upon receipt of a parcel tracing request, acquires the identification information of the parcel from the radio tag reader storing the same and having a scheduled arrival date corresponding to the current date with reference to the scheduled arrival dates held in the arrival scheduling unit, thereby determining the identification information of the traced parcel from the result acquired and responds the current position thereof.

In this case also, the parcel retrieving unit instructs the plurality of the radio tag readers having a scheduled arrival date within a time range determined by adding or subtracting a prescribed time to or from the current date upon receipt of a tracing request to read the stored information, thereby determining the identification information of the traced parcel from the result of read. The parcel retrieving unit may acquire stored information from the radio tag readers having a past scheduled arrival date the closest to the current date when the tracing request is received, thereby determining the identification information of the traced parcel from the result of acquisition. Further, the parcel retrieving unit may select the plurality of radio tag readers having past scheduled arrival dates close to the current date for which a tracing request is received in the order of closer to more distant ones to acquire stored information, thereby determining the identification information of the traced parcel from the result of acquisition.

When the identification information of the traced parcel cannot be determined from the result of acquisition of the radio tag reader, the parcel retrieving unit acquires stored information from the radio tag reader having an earlier scheduled arrival date, thereby determining the identification information of the traced parcel.

The present invention provides a parcel tracing method of a distribution system. More specifically, the parcel tracing method of the present invention having a radio tag which is attached to a parcel, into which identification information of a parcel is written and a radio tag reader which is arranged on a distribution route and has a communication function, comprises:

an arrival scheduling step of preparing and holding a scheduled arrival date when the parcel is scheduled to arrive at a tag communicable area of the radio tag reader installed on a distribution route; and a parcel retrieving step of instructing, upon receipt of a parcel tracing request, the radio tag reader having a scheduled arrival date corresponding to the current date to read the radio tag with reference to the scheduled arrival date held by the arrival scheduling unit, and responding the current position by determining the identification information of the traced parcel from the result of read of the radio tag returned from the radio tag reader.

Another embodiment of the parcel tracing method of a distribution system of the present invention, attached to a parcel and having a radio tag having identification information of the parcel written therein, and a radio tag reader which, upon arrival of the parcel having the radio tag attached thereto, a communication function of receiving and storing the identification information of the parcel, comprises:

an arrival scheduling step which prepares and holds scheduled arrival date when the parcel arrives at a tag communicable area of the radio tag reader installed on the distribution route; and a parcel retrieving step which, upon receipt of a parcel tracing request, acquires the identification information of the parcel stored from the radio tag reader having the scheduled arrival date corresponding to the current date with reference to the scheduled arrival date held by the arrival scheduling unit, determines the identification information of the traced parcel from the result of acquisition, and responds the current position.

The present invention provides a program for parcel tracing executed by a server of a distribution system. More specifically, the program of the present invention, which is arranged on a distribution route, and causes a computer constituting a server connected via the internet to a plurality of radio tag readers reading the identification information of a parcel written in radio tags attached to the parcel to execute:

an arrival scheduling step of preparing and holding a scheduled transit date when the parcel arrives at the tag communicable area of the radio tag reader arranged on the distribution route; and a parcel retrieving step which, upon receipt of a parcel tracing request, instructs the radio tag reader having the scheduled arrival date corresponding to the current date with reference to the scheduled arrival date held by the arrival scheduling unit to read the radio tag, determine the identification information of the traced parcel from the result of read of the radio tag returned from the radio tag reader and responds the current position.

Another embodiment of the program of the present invention is arranged on a distribution route, and causes a computer constituting a server connected via the internet to a plurality of radio tag readers reading and storing identification information of a parcel written into a radio tag attached to the parcel to execute:

an arrival scheduling step which prepares and holds scheduled arrival date when the parcel arrives at a tag communicable area of the radio tag reader installed on the distribution route; and a parcel retrieving step which, upon receipt of a parcel tracing request, acquires the identification information of the parcel stored from the radio tag reader having the scheduled arrival date corresponding to the current date with reference to the scheduled arrival date held by the arrival scheduling unit, determines the identification information of the traced parcel from the result of acquisition, and responds the current position.

According to the present invention, radio tag readers having an internet communication function are provided in advance at course points on the distribution route. Upon receipt of a parcel tracing request, the radio tag reader of the course point having the scheduled arrival date the closest to the current date can be selected. By directly accessing the radio tag reader via the internet, it is possible to acquire data of the radio tag attached to the parcel and to retrieve the identification information of the corresponding parcel, thereby rapidly retrieving and responding the current position of the parcel on the distribution route.

In another embodiment of the present invention, it is possible to rapidly retrieve and respond the current position of the parcel on the distribution route by reading and storing data of the radio tag attached to the parcel by means of radio tag readers at course points, selecting the radio tag reader of the course point having a scheduled arrival time the closest to the current time upon receipt of a parcel tracing request.

When retrieving the stored data, the parcel can be recognized to have already reached this point even when the parcel has already passed through the communicable area of the radio tag reader, thus making it possible to specify the current position of the parcel.

The above and other objects, features, and advantages of the present invention will becomes more apparent from the following detailed description with reference to the drawings.

BRIEF DESCRIPTION OF THE DRAWINGS

FIG. 5 is a descriptive view of the tag data file shown in FIG. 1;

FIG. 6 is a descriptive view of the merchandise data file shown in FIG. 1;

FIG. 7 is a descriptive view of the transfer affirmation data file shown in FIG. 1;

FIG. 8 is a descriptive view of the course passage point master file shown in FIG. 1;

FIGS. 9A and 9B are descriptive views of the transfer schedule data file shown in FIG. 1;

DESCRIPTION OF THE PREFERRED EMBODIMENTS

Figure 1:
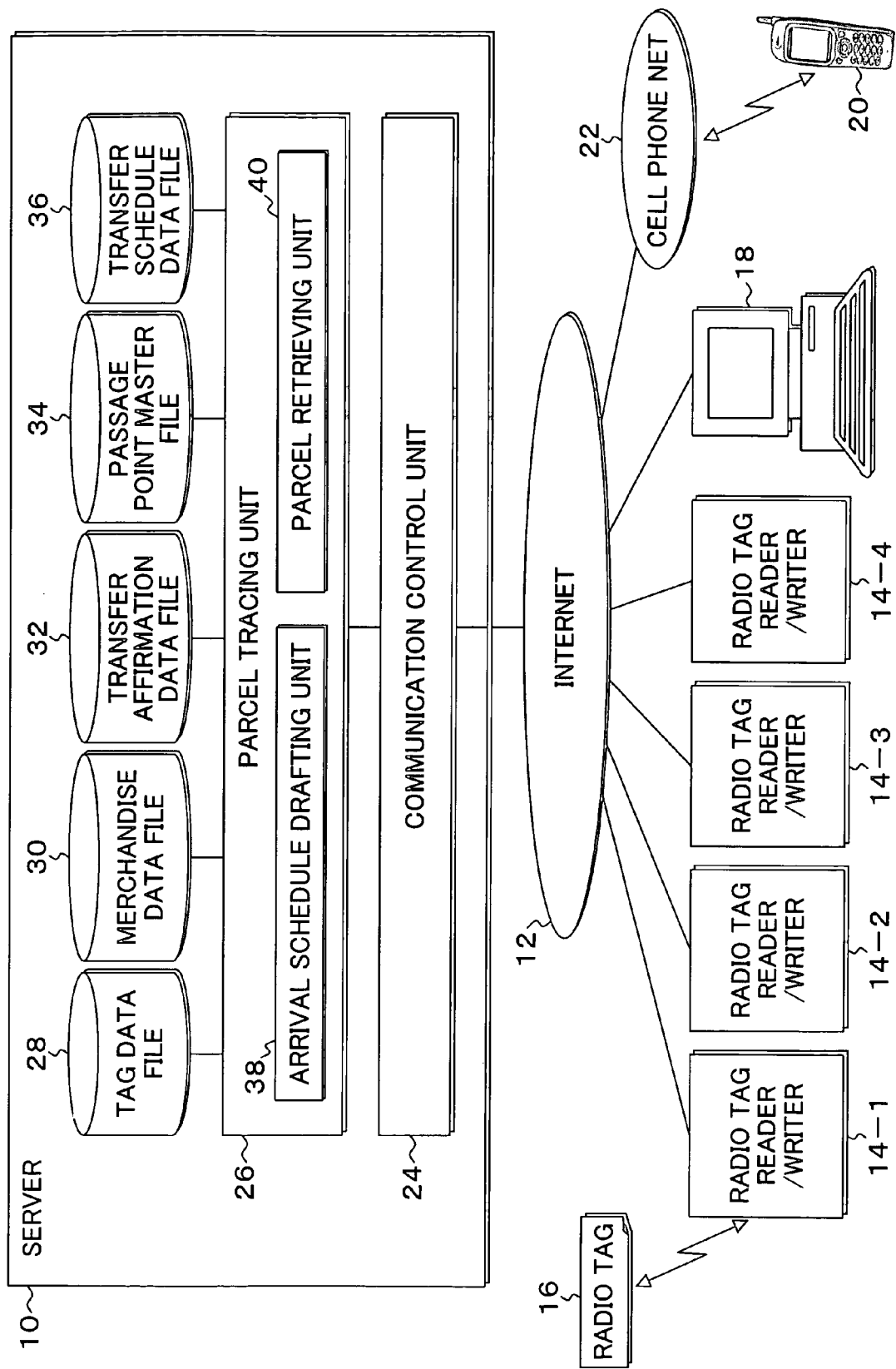
FIG. 1 is a block diagram of an embodiment of the parcel tracing system of the present invention.

FIG. 1 is a block diagram of an embodiment of the parcel tracing system of the present invention. In FIG. 1, the parcel tracing system of the present invention has a server 10 at a control center of an enterprise managing a distribution system such as a door-to-door trucking service, and radio tag readers/writers 14-1, 14-2, 14-3 and 14-4 serving as radio tag readers installed at course points of the distribution route via the internet are connected to the server 10.

Course points on a distribution route at which radio tag readers/writers 14-1 to 14-4 are installed in various forms, depending upon the distribution system of the parcel. In the case of the door-to-door trucking system, for example, the pickup center, the departure base, the arrival base, the distribution center, and further, the working trucks between pickup trucks and the bases serve as course points, and a radio tag reader/writer is connected to each point.

The radio tag readers/writers 14-1 to 14-4 installed at course points such as the collecting center have communicable areas which can read all the radio tags 16 of parcels present in these course points.

In a door-to-door trucking system, a pickup operator who visits clients or agents and receives parcels issues a radio tag 16 storing information necessary for distribution by means of a portable radio tag reader/writer, and attaches the issued tags to parcels. This portable radio tag reader/writer is also connected to the internet through, for example, a cell phone net 22 by a radio line. This is also the case with the portable radio tag reader/writer held by a distribution operator who finally delivers parcels to users at destinations.

The user terminal 18 of a client requesting a parcel via the internet is connected to the server 10. The client can know the current position of the parcel on the transportation route of parcels by sending a parcel tracing Request specifying the identification information of the merchandise to the server 10 with reference to the web site for the parcel tracing system of the server 10 by use of the WWW browser of the user terminal 18.

In addition, the client can request parcel tracing to the server 10 via the internet 12 from the cell phone net 22 by use of an application of the user cell phone 20, apart from the user terminal 18.

A communication control unit 24 and a parcel tracing unit 26 are provided in the server 10. A tag data file 28, a merchandise data file 30, a transfer affirmation data file 32, a course passage point master file 34 and a transfer schedule data file 36 as databases are connected to the parcel tracing unit 26.

Functions including an arrival scheduling unit 38 and a parcel retrieving unit 40 are provided in the parcel tracing unit 26. Upon receipt of a pickup information of parcels from terminals of collection centers and the like at the server 10, the arrival scheduling unit 38 prepares scheduled arrival times when parcels are scheduled to arrive at tag communicable areas of the radio tag readers/writers at passage points installed on the distribution route to the destinations available from the collection information, and stores the data in the transfer schedule data file 36. The preparation of the transfer schedule data is accomplished by the utilization of the contents of the tag data file 28, the merchandise file 30, the transfer affirmation data file 32 and the course passage point master file 34.

Upon receipt of a parcel tracing request specifying the identification number of the parcel from the user terminal 18 or the user cell phone 20, the parcel retrieving unit 40 uses the current date as the receiving time of the parcel tracing request, retrieves the radio tag reader/writer having a scheduled arrival date close to the current date on the basis of the scheduled arrival date of the parcel to be traced stored in the scheduled transfer data file 36, instructs the retrieved radio tag reader/writer to read the radio tag, determines the identification information of the traced parcel from the result of read of the radio tag, prepares a response screen by the use of a map image of the distribution route, and responds the current position of the parcel to the user terminal 18 or the user cell phone 20.

Figure 2:
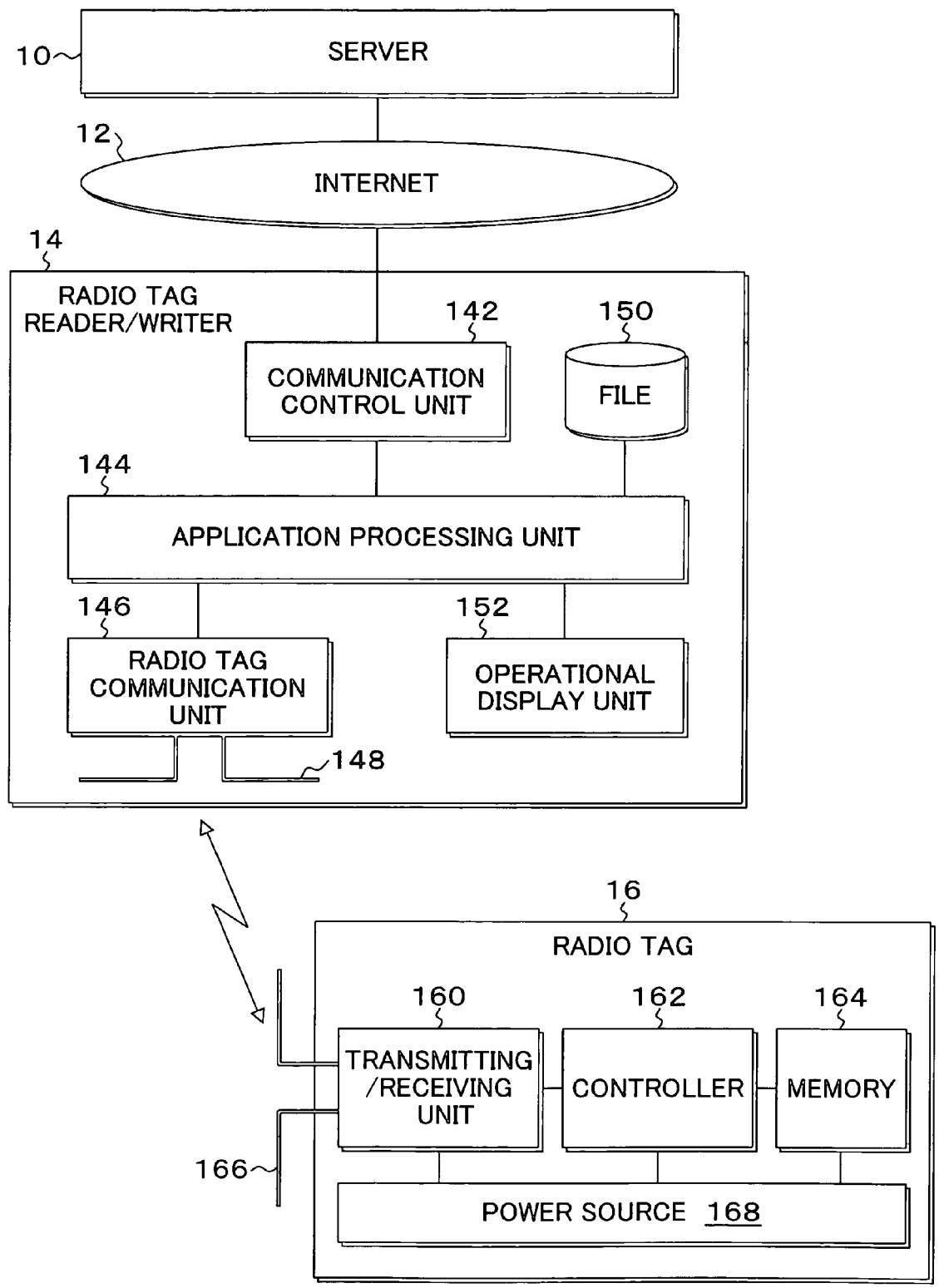
FIG. 2 is a block diagram illustrating the configuration of the radio tag reader/writer and the radio tag shown in FIG. 1.

FIG. 2 is a block diagram illustrating the configuration of the radio tag reader/writer and the radio tag provided in the parcel tracing system shown in FIG. 1. In FIG. 2, the radio tag reader/writer 14 comprises a communication control unit 142, an application processing unit 144, a radio tag communication unit 146, an antenna 148, an operation display unit 152, and a file 150. The radio tag 16 comprises a n antenna 166, a transmitting/receiving unit 160, a controller 162, a memory 164 and a power supply 168.

When the radio tag 16 enters the communicable area of the antenna 148 provided in the radio tag communication unit 146 of the radio tag reader/writer 14, the power supply unit 168 is activated, supplying power to the individual component parts upon receipt of electromagnetic induction of the receiver electromagnetic waves through the antenna 166.

The radio tag communicating unit 146 of the radio tag reader/writer 14 constantly transmits a tag reading request, and upon receipt thereof by the transmitting/receiving unit 160 of the radio tag 16, the controller 162 reads the distribution information including the identification information of the parcel stored in the memory 164 and transmits the read information for response. The radio tag 16 is, for example, a small-sized semiconductor chip smaller than 0.5 mm.

Upon receipt of an instruction to request read of the radio tag based on a parcel tracing request of the user from the server 10, the radio tag reader/writer 14 incorporates response information from all the radio tags 16 existing in the communicable area received by the application processing unit 144 in the radio tag communication unit 146, and responds the same to the server 10 via the internet from the communication control unit 142. The application processing unit 144 can store the read information from the radio tag 16 as required into the file 150.

Figure 3:
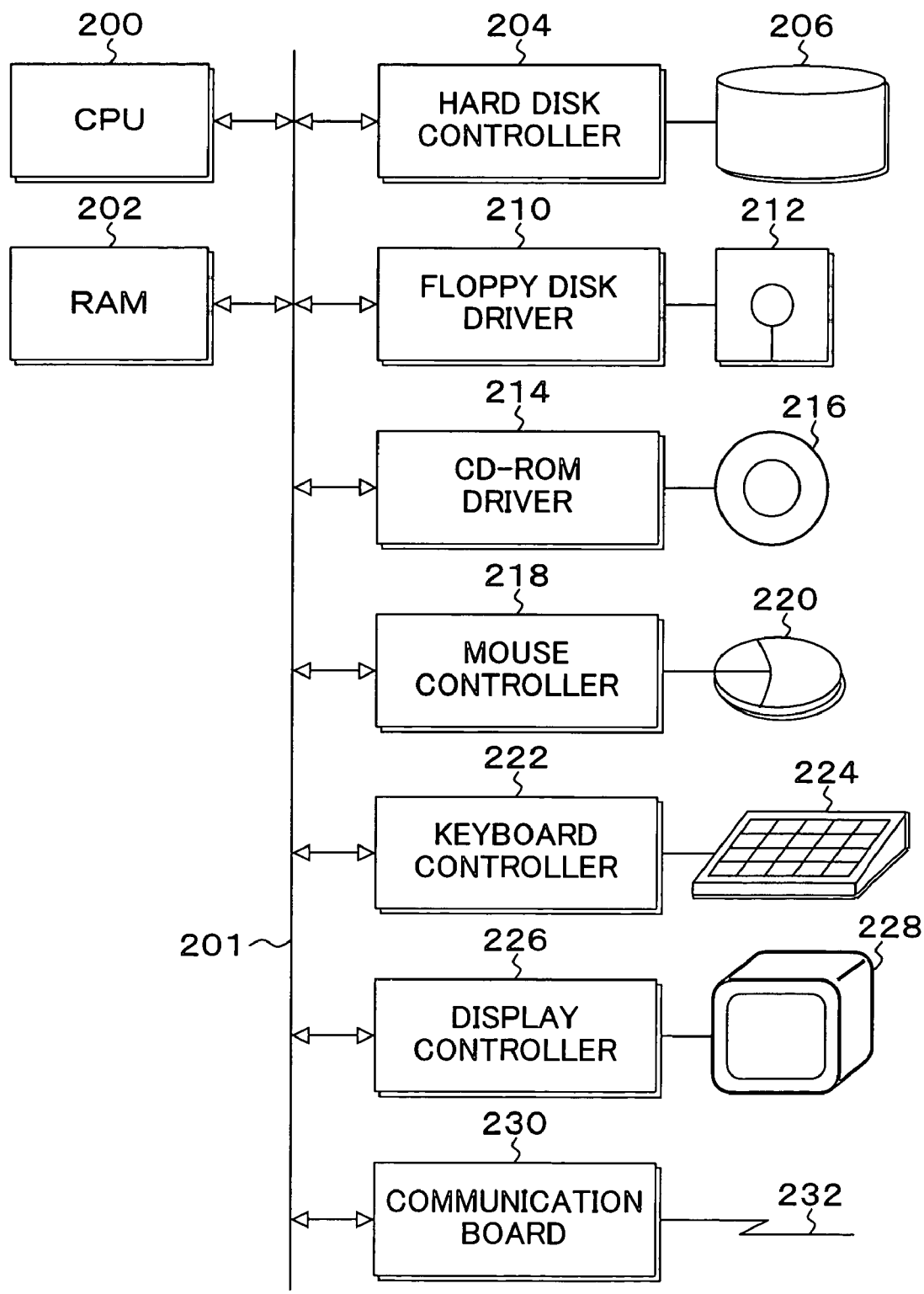
FIG. 3 is a descriptive view of the hardware environment of the computer serving as the server shown in FIG. 1.

FIG. 3 is a descriptive view of hardware resources of the computer comprising the server 10 shown in FIG. 1. In the computer shown in FIG. 3, a RAM 202, a hard disk controller (software) 204, a floppy disk driver (software) 210, a CD-ROM driver (software) 214, a mouse controller 218, a keyboard controller 222, a display controller 226, and a communication board 230 are connected to a bus 201 of a CPU 200.

The hard disk controller 204 connects a hard disk drive 206, and loads the programs for executing parcel tracing control of the present invention. Upon starting up the computer, it reads out a necessary program from the Hard disk drive 206, expands the program on the RAM 202, and executes it by means of the CPU.

A floppy drive (hardware) 212 is connected to the floppy disk drive 210 to permit write into the floppy disk (R). A CD drive (hardware) 216 is connected to the CD-ROM driver 214 to enable to read out data or a program stored in the CD.

The mouse controller 218 transmits an input operation of the mouse 220 to the CPU 200. The keyboard controller 222 transmits an input operation of the keyboard 224 to the CPU 200. The display controller 226 carries out a display on the display unit 228. The communication board 230 conducts communication with devices on the internet by the use of the communication line 232.

Figure 4A:
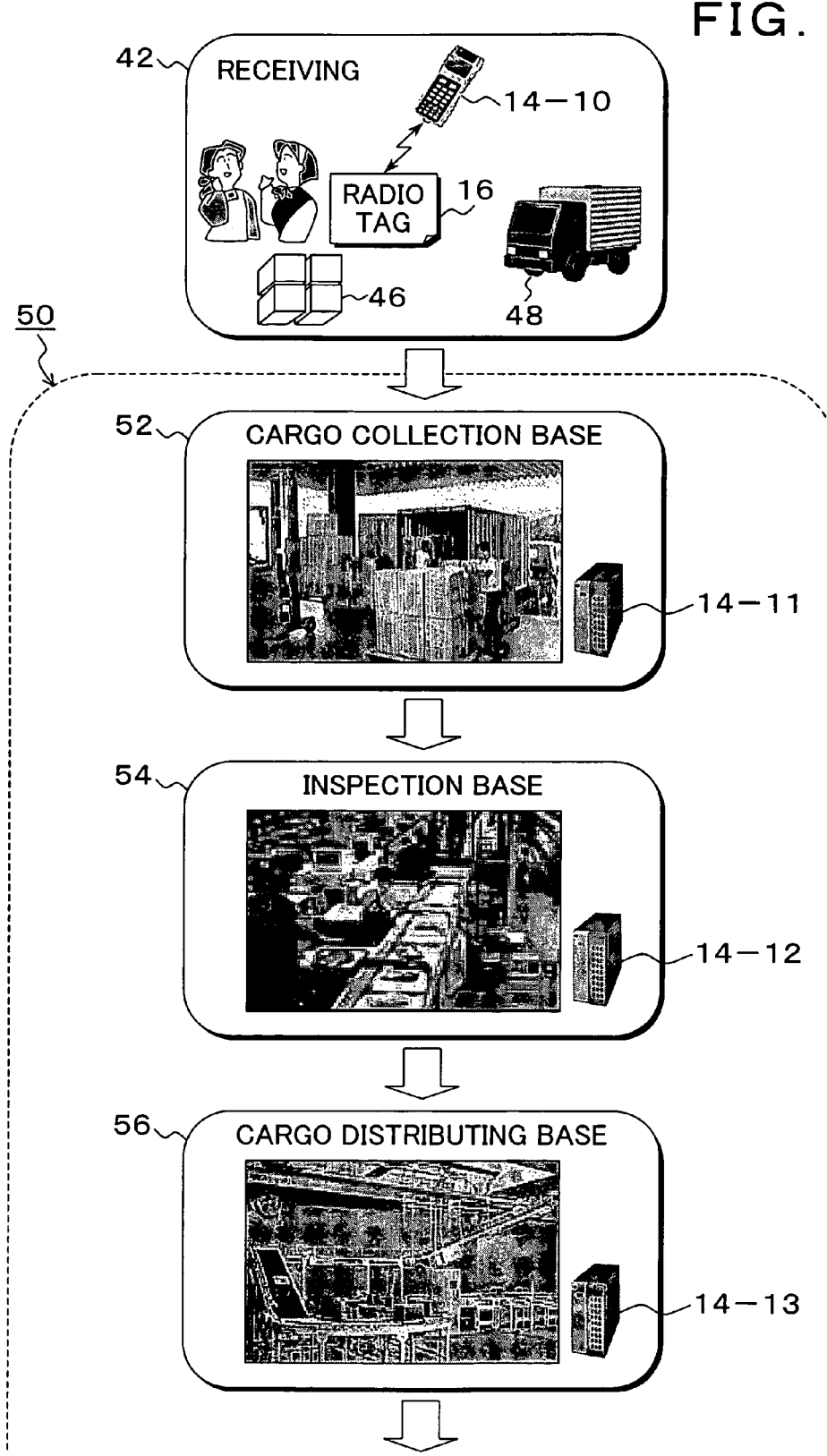
FIGS. 4A and 4B are descriptive views of the radio tag reader/writer installed at a course point of the distribution system to which the present invention is applied.
Figure 4B:
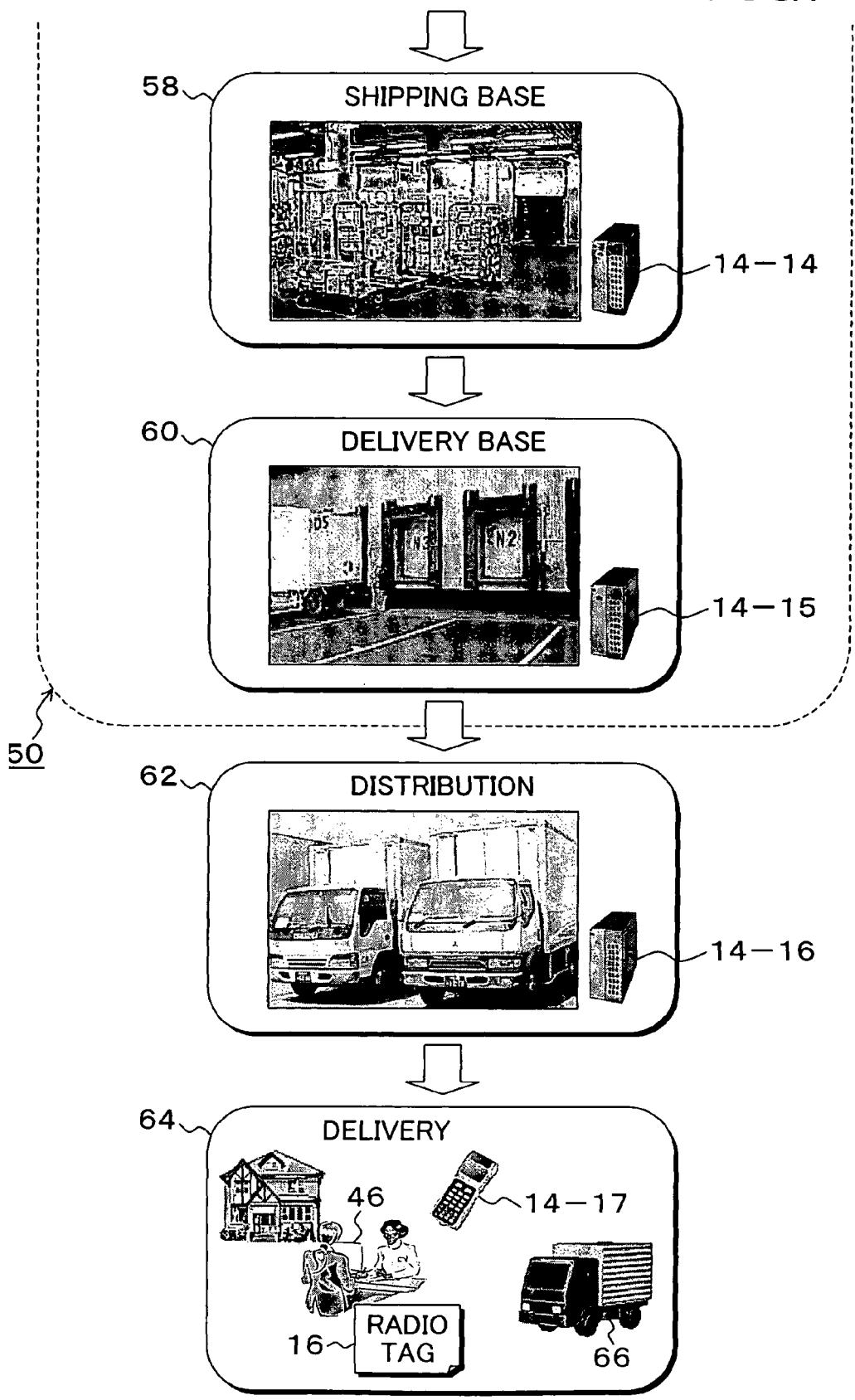

FIGS. 4A and 4B are descriptive views of the radio tag reader/writer installed at course points of the distribution system to which the present invention is applicable.

In FIG. 4A, pickup 42 means that a pickup operation visits clients by use of a delivery truck and picks up parcels. The pickup operator has a portable reader/writer 111114-10. He (she) enters information necessary for distribution of parcels from the keyboard, writes the result of input in the radio tag 16, and attaches the radio tags 16 after write to the parcels for pickup.

Information to be entered from the portable reader/writer 14-10 includes the radio tag number, the merchandise ID (parcel identification information) for identifying the parcel, the client identification such as address, name and telephone number of the client, the destination information such as address, name and telephone number of the destination, and as required, a designated arrival date desired by the client. All these pieces of information are written into the radio tag 16, and are notified to the server 10 at the center via the radio line from the portable reader/writer 14-10.

Upon the completion of pickup 42, the parcel 46 is conveyed into the pickup center 50. The distribution system shown in FIGS. 4A and 4B is an example in distribution in a relatively small locality in which destinations of parcels belong to a single pickup center. Parcels conveyed to the pickup center 50 pass through a pickup point 52, whereby information of the radio tags attached to the parcels are read out by the radio tag reader/writer 14-11 installed therein. As required, completion of pickup and other pieces of information can be written into the radio tags 16 from the radio tag reader/writer 14-11.

Then, the parcels are sent to the inspection point to conduct an inspection. A radio tag reader/writer 14-12 is also installed in the inspection point 54 to read out the information contained in the radio tags 16 of all the parcels through the inspection point 54, and as required, information is written into the radio tags 16.

Then, the parcels are transferred to a sorting point to perform sorting of the parcels. In the sorting point 56 also, the radio tags 16, all the parcels passing through are read and necessary information is written therein by the radio tag reader/writer 14-13.

Then, the parcels are transferred to the shipping base 58 shown in FIG. 4B, and are arranged in accordance with the division of the area under control of the pickup center 50. In this case also, a radio tag reader/writer 14-14 reads out the radio tags 16 of all the parcels, and writes necessary information.

Finally, the parcels are sent to the issue base 60, waiting for issue from the warehouse. A radio tag reader/writer 14-15 is installed to permit read of the radio tags 16 of all the parcels waiting for issue and write of necessary information. When a scheduled issue time is reached at an issue point 60 in the pickup center 50, the parcels are loaded onto the distribution truck 66 for distribution 62.

Finally, a delivery truck 66 conveys the parcels 46 to the destination and delivery 64 is thus accomplished. After the delivery, the portable tag reader/writer 14-17 held by the delivery operator performs read and necessary write of the radio tag 16 of the parcel 46 already delivered, thus completing a series of delivery operations.

FIG. 5 is a descriptive view of the tag data file 28 shown in FIG. 1. The tag data file 28 contains the tag number 68, the parcel ID 70 serving as the identification information of the parcel, the client information 72, the destination information 74 and the designated arrival date 76.

These contents of the tag data file 28 are available from write in the radio tag 16 carried out through the portable reader/writer 14-10 by the pickup operator upon pickup 42 shown in FIG. 4A. These contents are read out by the radio tag reader/writer 14-11 upon passage of the parcel through the pickup point 52 of the pickup center 50, and stored in the tag data file 28 of the server 10.

FIG. 6 is a descriptive view of the merchandise data file shown in FIG. 1. The merchandise data file 30 comprises a parcel ID 70, client information 72, destination information 74, an entry date 78, a designated arrival date, and a password 82. The read of this merchandise data file is prepared for each parcel conveyed and registered.

FIG. 7 is a descriptive view of the transfer affirmation data file 32 shown in FIG. 1. The transfer affirmation data file 32 contains a parcel ID 70, a distribution truck number 84, a departure time 86 and a route number 88. The departure time 86 is a date when the parcel was taken out from the warehouse of the distribution center and was loaded onto the distribution truck, and values of "year, month, day, hour and minutes" are stored.

The record of the transfer affirmation data file 32 is prepared at a point in time when the departure date and the route regarding distribution of each parcel are determined by the arrival scheduling unit 38, and registered.

FIG. 8 is a descriptive view of the course passage point master file 34. The course passage point master file 334 has a route number 88, a reader/writer number 90, the time difference 92 from the preceding reader/writer, a communication address 94 and a location information 96 registered therein. The course passage point master file 34 is registered in advance prior to each run of processing.

More specifically, the course passage point master file 34 registers the reader/writer number 90 for each course point at which a radio tag reader/writer is installed on the distribution route with the route number 88 representing the distribution route of parcels as an index. The course passage point master file 34 registers the time difference 92 required for conveying the parcel to the preceding radio tag reader/writer, stores the communication address 94 on the internet for accessing the individual radio tag readers/writers, and further, registers the location information 96 showing locations at which radio tag readers/writers are installed to provide information about the location of tracing.

FIGS. 9A and 9B are descriptive views of the transfer schedule data file 36 shown in FIG. 1. The transfer schedule data file 36 is prepared by the arrival scheduling unit 38 and registered, and is prepared for each of the parcel Ids 70-1 and 70-2 as shown in FIGS. 9A and 9B. For example, in the case of a parcel "B01" shown in FIG. 9A, The transfer schedule data file 36 stores the parcel 70-1, the route number 88-1, the reader/writer number 90-1 and the scheduled arrival date 98-1.

The scheduled arrival date 98-1 corresponding to the reader/writer number 90-1 is determined, starting from the date of departure 86 in the transfer affirmation data file 32 shown in FIG. 7, by adding the value of time difference 92 from the preceding reader/writer of the reader/writer number 90 given by the route number 88 corresponding to the course passage point master file 34 shown in FIG. 8.

The selecting processing of the radio tag reader/writer for instructing read of the identification information of the parcel, installed on the conveying route, upon receipt of a parcel tracing request from the user terminal 18 by the parcel retrieving unit 40 of the parcel tracing unit 26 in the server 10 shown in FIG. 1 will now be described.

The parcel tracing unit 26 specifies a parcel ID upon receipt of a parcel tracing request from the user terminal 18, and compares the same with the scheduled arrival date of the course points at which radio tag readers/writers storing the tracing request entry times in the transfer schedule data file corresponding to the parcel ID specified as the current times, thus selecting a course point at which read of the radio tag is to be instructed.

Selection processing off the radio tag reading point in the present invention is accomplished by any of the following three methods:

(1) selecting a plurality of radio tag readers/writers of which the scheduled arrival dates are within the time range obtained by adding or subtracting a prescribed time T to or from the current date when a tracing request is received;

(2) selecting radio tag readers/writers having scheduled arrival dates earlier than and the closest to the current date when the tracing request is received; and (3) selecting a predetermined prescribed number of radio tag readers/writers having scheduled arrival dates earlier than the present date when the tracing request is received inn the order from closer to more distant ones.

Figure 10:
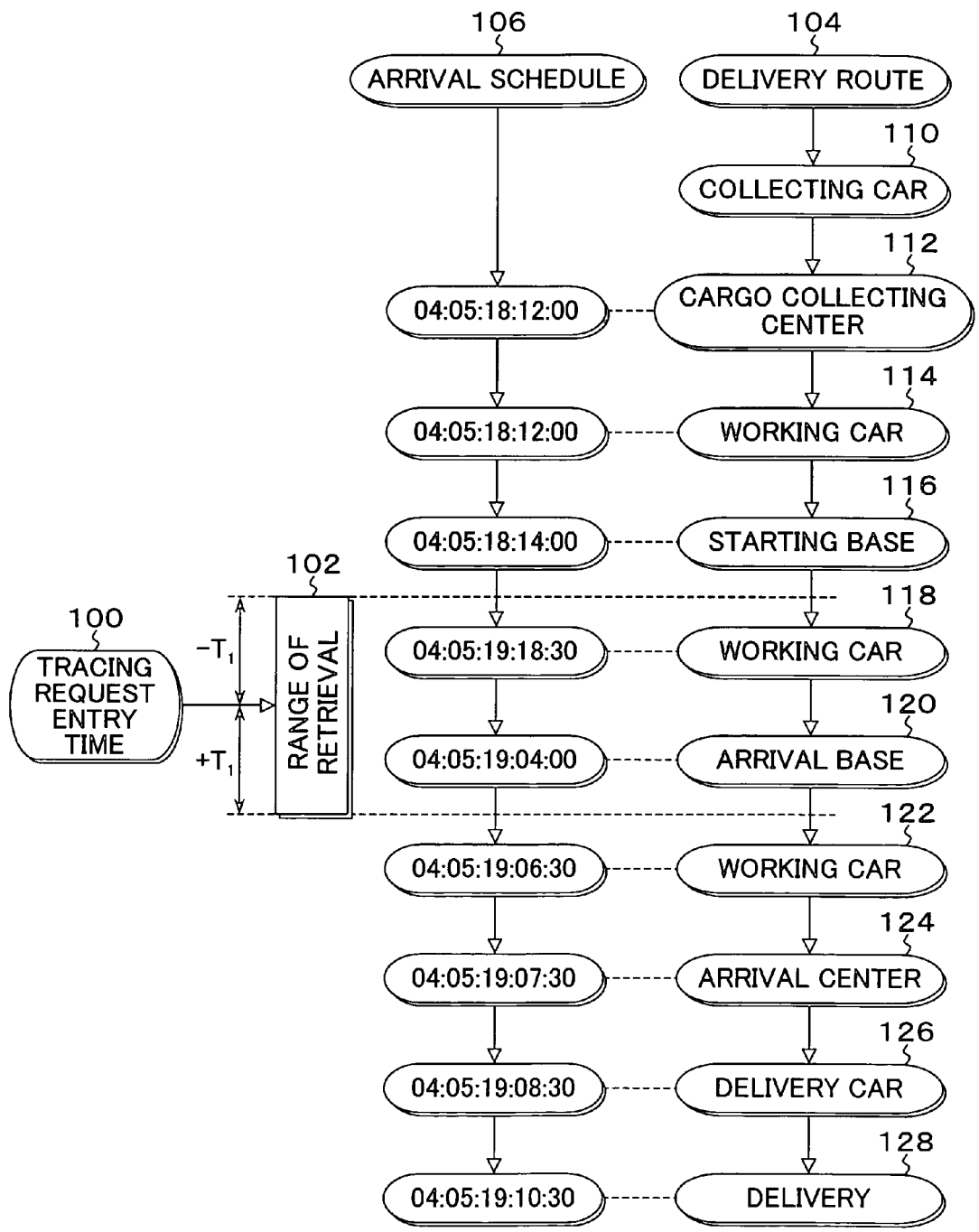
FIG. 10 is a descriptive view of the narrowing processing of the course point based on the tracing request entry time.

FIG. 10 is a descriptive view of course point selection in the case where a time range obtained by adding or subtracting a prescribed time T1 to or from the tracing request entry time 100 of (1) above is used as the range of retrieval 102. The distribution route 104 represents a case where the destination is distant from the pickup area. In the case of a distant location, parcels gathered in the pickup center are collected in the departure base, and transported in the night to the arrival base managing the destination by use of an expressway, and transferred to the distribution center managing the destination, and then delivered.

The course points of the distribution route 104 in this case include the distribution truck 110, the pickup center 112, the working truck 114, the departure base 16, the working truck 118, the arrival base 120, the working truck 122, the arrival center 124, the distribution truck 126, and the delivery at the final destination. For all these course points, radio tag readers/writers are installed so that the radio tags attached to all the parcels are read out, as in the case shown in FIGS. 4A and 4B.

The pickup center, the departure base 116, the arrival base 150 and the arrival center 124 are internally divided into a plurality of different bases including reception, sorting and issue, and for these internal bases, radio tag readers/writers are installed so that the radio tags of all the parcels can be read out.

For such a distribution route 104, when, for example, payoff times of the pickup center 112 "04:05:18:12:00" are determined, the subsequent scheduled arrival dates are prepared on the basis of the time difference between readers/writers in the course point passage point master file 34 shown in FIG. 8, and are stored for each parcel in the transfer schedule data file 36 in the form of transfer schedule data shown in FIGS. 9A and 9B as information comprising a combination of the distribution route 104 and the transfer schedule data file 36.

Upon receipt of a parcel tracing request from a user in a state of preservation of the distribution route 104 and the arrival schedule 106, the arrival schedule 106 is referred to with the tracing request entry time 100 as the current time, and the arrival schedule 106 is referred to, in this case, the time obtained by adding or subtracting a certain time T1 to or from the tracing request entry time 100 as the range of retrieval 102. In this case, the time zone of the range of retrieval 102 includes the scheduled arrival time of the working truck at the arrival base 120 within the time zone of the range of retrieval 102.

Therefore, the parcel retrieving unit 40 of the server 10 acquires the communication addresses of the selected working truck 118 and arrival base 120 with reference to the course passage point master file 34 shown in FIG. 8; instructs the radio tag readers/writers of the selected working truck 118 and arrival base 120 to read the radio tags; acquires all pieces of parcel identification information read out by the individual radio tag readers/writers; and determines whether or not there is available the identification information of the parcel for which tracing is requested.

Figure 11:
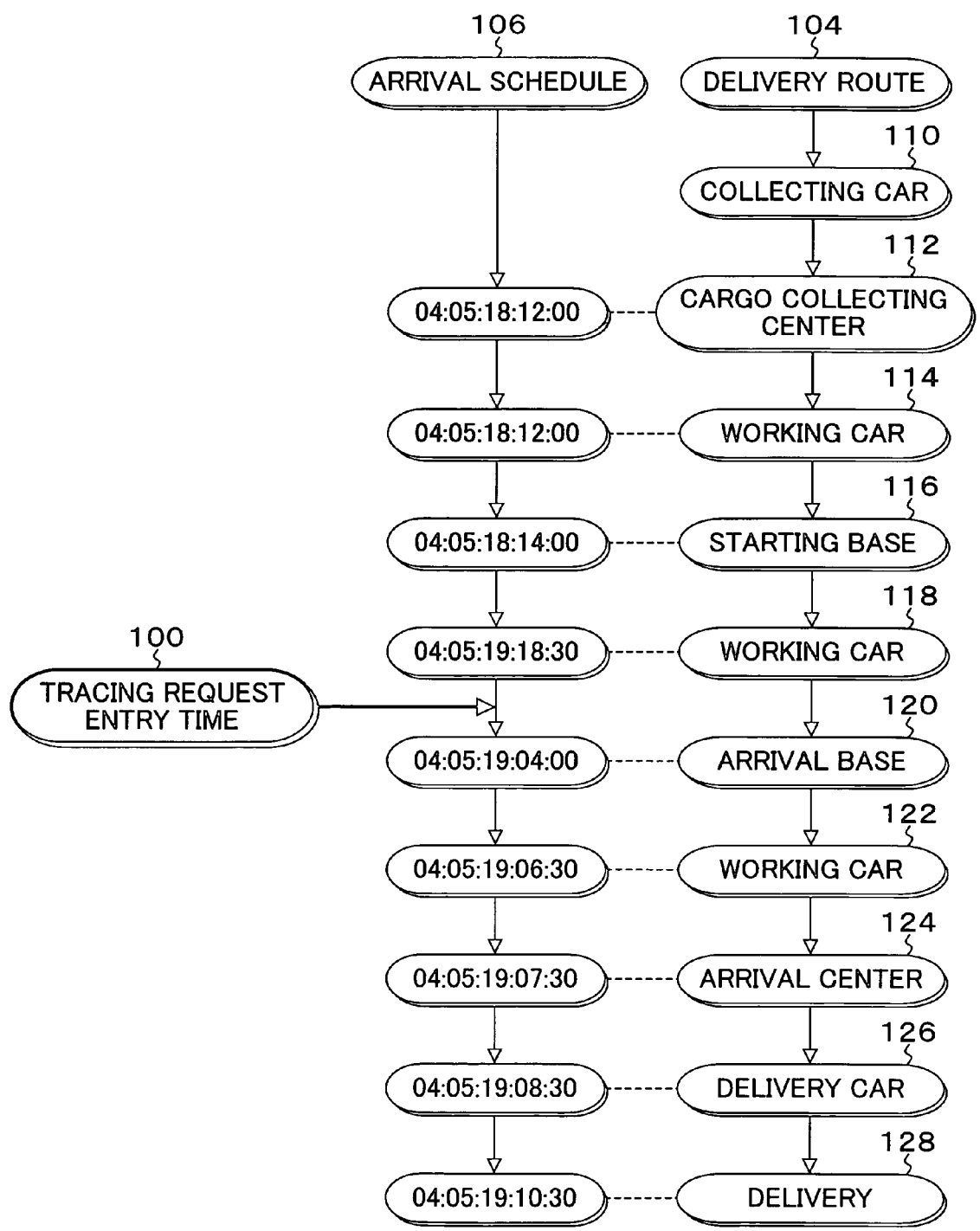
FIG. 11 is a descriptive view of the narrowing processing of another course point based on the tracing request entry time.

FIG. 11 is a descriptive view of the course passage point selecting processing of (2) above. In this selecting processing, read of the radio tag is instructed to the radio tag reader/writer mounted on the working truck 118 having a scheduled arrival time earlier than and the closest to the tracing request entry time 100 upon receipt of the parcel tracing request.

Figure 12:
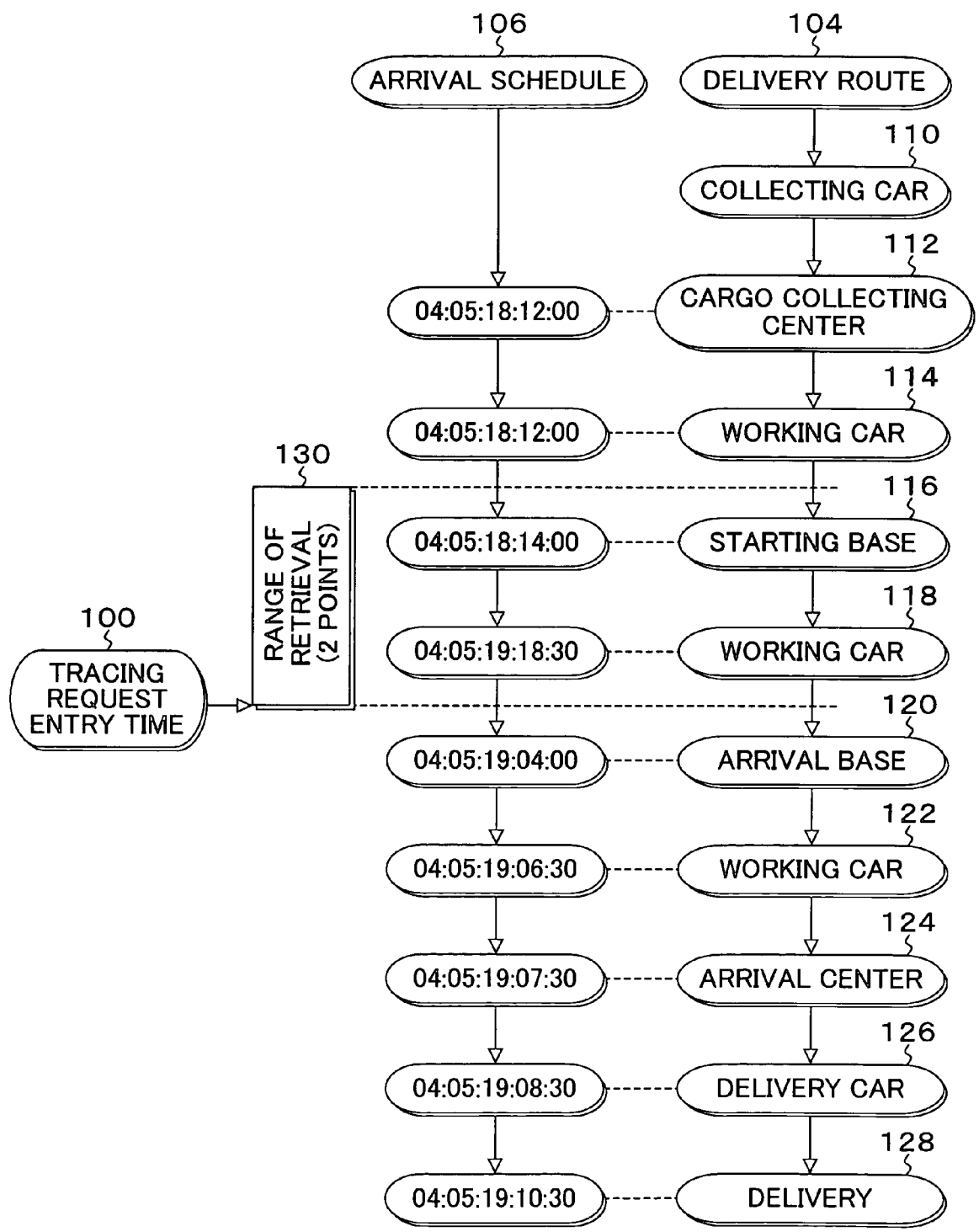
FIG. 12 is a descriptive view of the narrowing processing of still another course point based on the tracing request entry time.

FIG. 12 illustrates the passage point selecting process in (3) above. In this selecting processing, a prescribed number, for example, two of the radio tag readers/writers having scheduled arrival times earlier than the tracing request entry time are selected in the order from closer one, and it is instructed to read the radio tag. In this case, the passage point before the preceding one earlier than the tracing request entry time 100, i.e., the working truck 118 and the departure base 116 are selected, and instructed to read the radio tag.

In the selection of the radio tag reader/writer instructing read of the radio tag with the tracing request entry time in the present invention as the current time in comparison with the scheduled arrival time at the passage point, the radio tag reader/writer of the point having an scheduled arrival time earlier than in the case where the tracing request entry time is regarded as the current time should in principle be instructed to read the radio tag, since conveyance of an actual parcel tends to be in delay from the scheduled time.

Regarding read of the radio tag, the successful result of read can be achieved in determining the identification information of the traced parcel through the minimum necessary number of runs of read as compared with instruction of sequential retrieval from points closer to the current time, by instructing read of the radio tags by simultaneously selecting a plurality of course points having scheduled arrival times closer to the tracing request entry time.

Figure 13A:
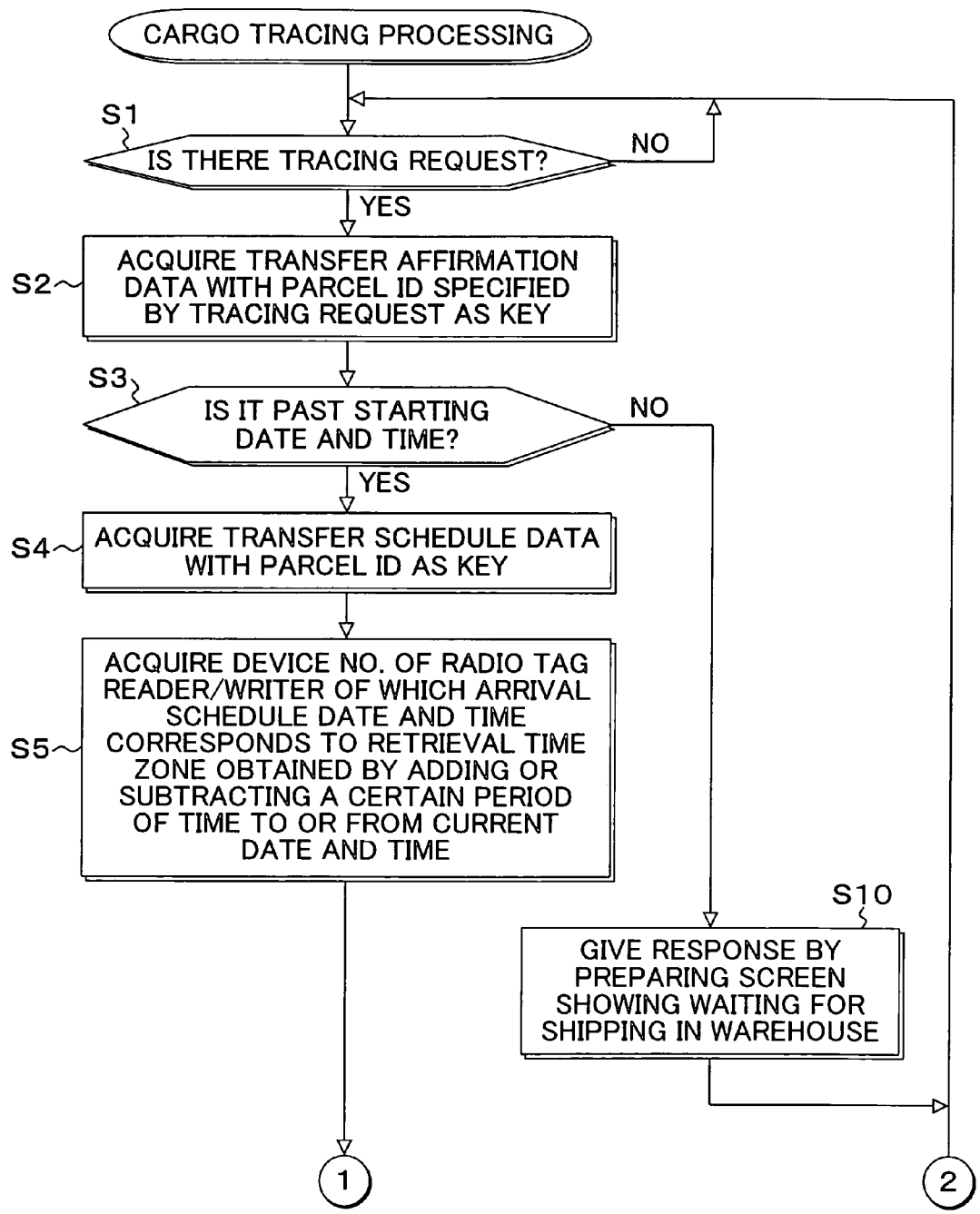
FIGS. 13A and 13B are flowcharts of the parcel tracing processing of the present invention based on the server shown in FIG. 1.
Figure 13B:
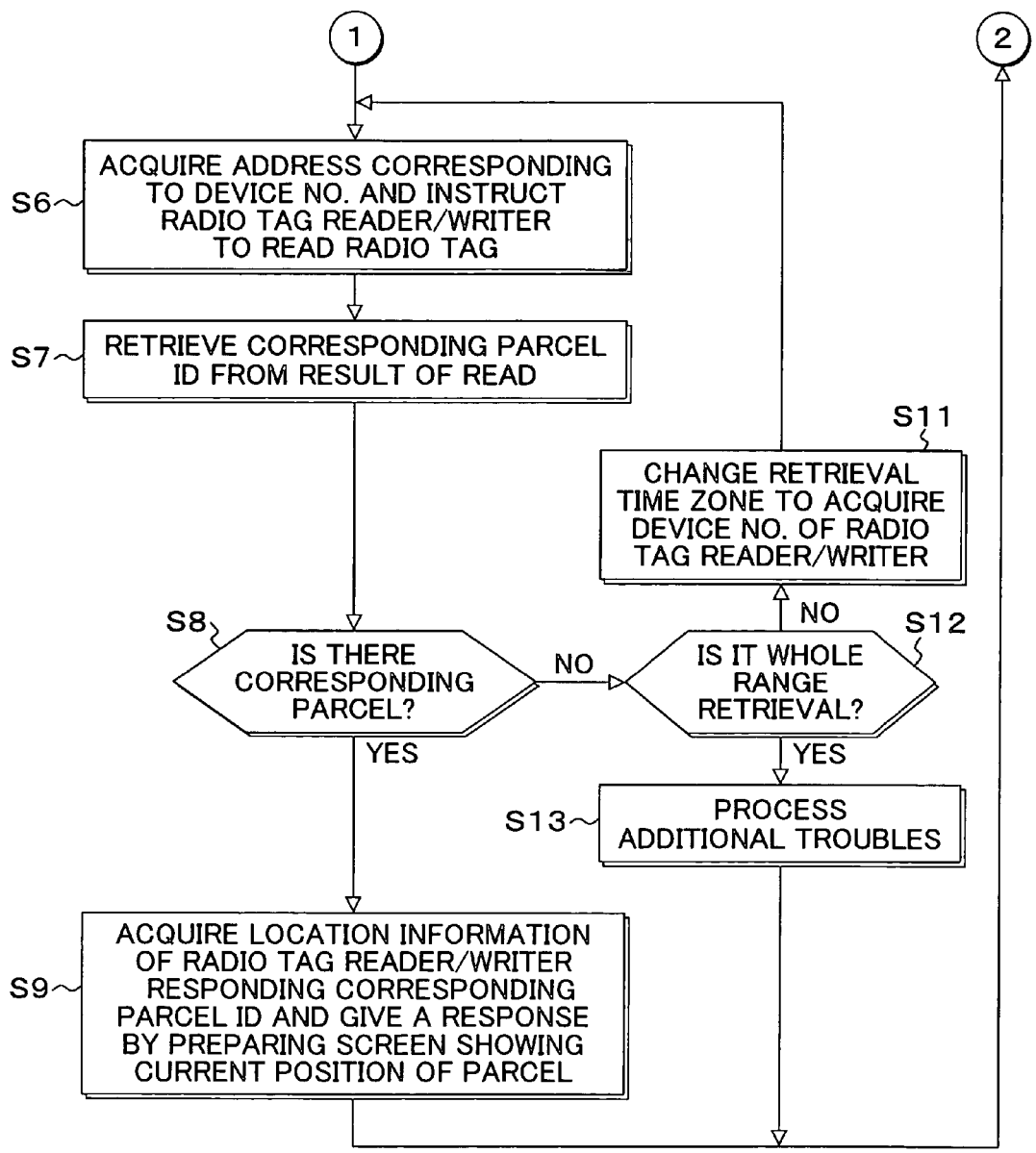

FIGS. 13A and 13B are flowcharts of the parcel tracing processing of the present invention based on the server 10 shown in FIG. 1. In FIG. 1, when a tracing request from the user is received in step S1, the transfer affirmation data is acquired from the transfer affirmation data file 32 shown in FIG. 7 with the parcel ID specified in the tracing request as a key in step S2.

Since a departure date corresponding to the issue date from the distribution center is stored in the thus acquired transfer affirmation data, it is checked in step S3 whether or not the current date when the tracing request is received is past the departure date obtained from the transfer affirmation data in step S3. If the current date is before the departure date, the parcel must be stored in the warehouse of the collection center and is waiting for issue. The process therefore advances to step S10, in which a screen showing the waiting state for issue is prepared and this is responded to the user terminal.

When the current date is past the departure date, the process goes to step S4. The corresponding transfer schedule data is acquired with reference to the transfer schedule data file 36 shown in FIGS. 9A and 9B with the parcel ID as a key. Then, in step S5, the device number of the radio tag reader/writer for which the scheduled arrival data falls within a retrieving time zone obtained by adding or subtracting a certain time to or from the current date through selecting processing shown in FIG. 10.

In step S6, a communication address corresponding to the device number acquired is obtained. Read of the radio tag is instructed to the corresponding radio tag reader/writer via the internet. Then in step S7, the read information of the radio tag from the radio tag reader/writer is retrieved for retrieving the corresponding parcel ID. If the parcel ID is retrieved in step S8, the process advances to step S9. The location information of the radio tag reader/writer corresponding to the parcel ID is acquired. A screen showing the current position of the parcel is prepared, and responded to the user terminal.

As a reference screen of the result of corresponding tracing result to be sent to the user terminal, map information is registered in advance as location information of the course passage point master file 34. It is thus possible to send the retrieval result screen in response to the user terminal as map information. Information about the client, the destination, and the scheduled arrival time may simultaneously be displayed with reference to the merchandise data file on the basis of the parcel ID on the response screen showing the current position of the parcel.

On the other hand, when the corresponding parcel ID cannot be determined from the radio tag read information from the radio tag reader/writer having instructed read in step S8, the process goes to step S12. It is checked whether or not all the range before the current time of the distribution route has been retrieved. If retrieval has not as yet been completed, the process advances to step S11. By changing the retrieval time zone, the reader/writer number which is the device number of a new radio tag reader/writer is acquired. In step S6, read of the radio tag is instructed again. In step S7, the corresponding parcel ID is retrieved from the result of read. Operations in steps S12, S11, S6, S7 and S8 are repeated until the corresponding parcel ID is determined in step S8.

When a corresponding parcel ID cannot be determined even upon the completion of retrieval of the entire range to be covered in step S12, a tracing trouble processing is performed in step S13. The tracing trouble processing is accomplished by outputting an alarm to the effect that the parcel in question could not be found in automatic tracing of the parcel to the operator of the center in which the server 10 is installed, and upon receipt thereof, the operator conducts tracing processing of the parcel through manual retrieval.

When a tracing trouble processing is to be carried out, the user terminal is informed that the tracing is now underway and the result of tracing will be notified through electronic mail or the like, and the user is urged to complete the parcel tracing processing.

Figure 14:
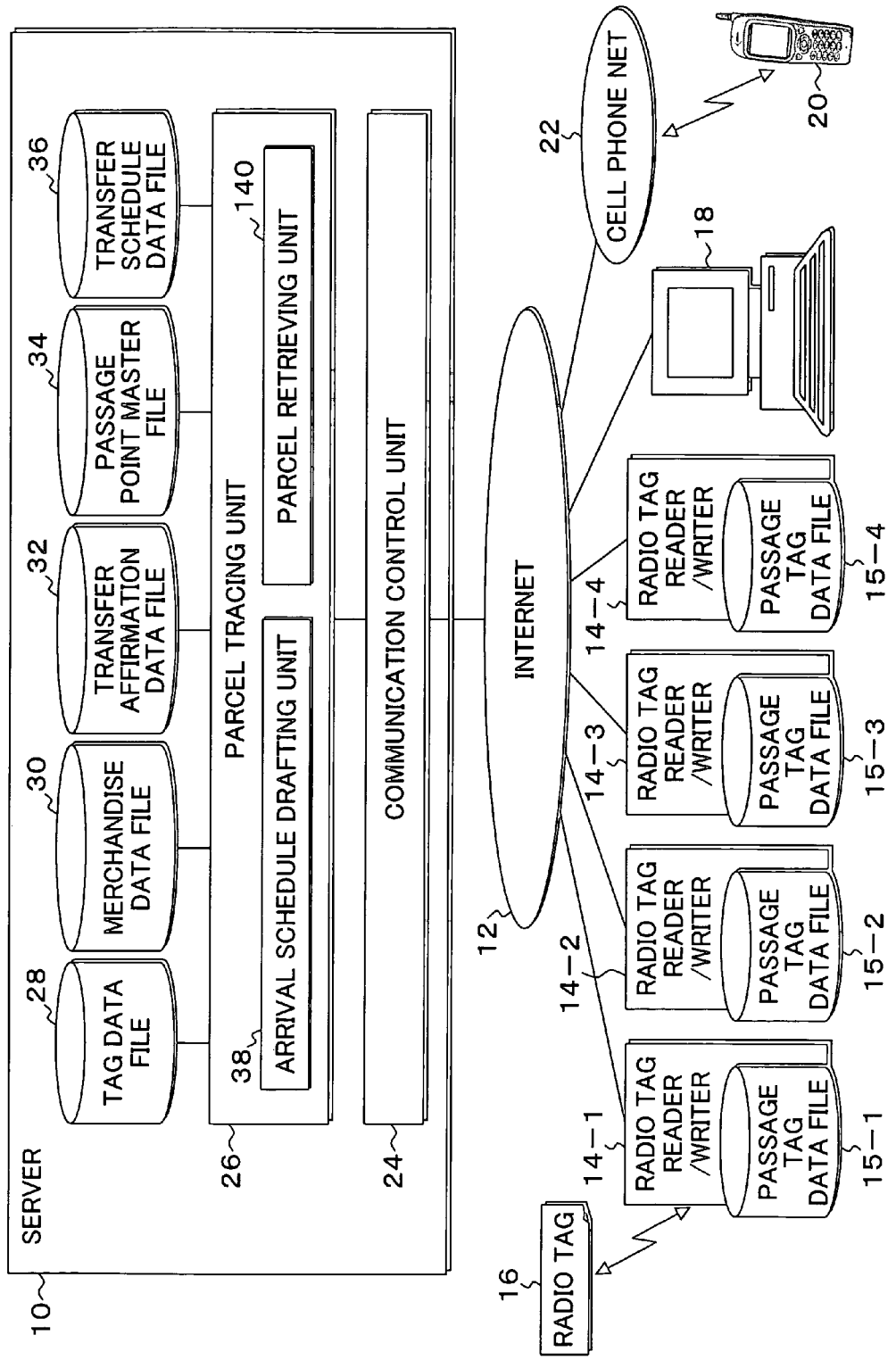
FIG. 14 is a block diagram of another embodiment of the parcel tracing system of the present invention.

FIG. 14 is a block diagram of another embodiment of the parcel tracing processing of the present invention. In this embodiment, passage tag data files 15-1 and 15-4 are provided for the radio tag readers/writers 14-1 to 14-4, respectively, installed at the course points of the parcel, and all the radio tags of the parcels passing through the installed course points are read and stored.

Upon receipt of a parcel tracing request from the user, the parcel tracing unit 26 of the server 10 reads out the read information of the radio tags stored in the passage data file to the radio tag reader/writer specified by selection relative to the scheduled arrival time by the parcel retrieving unit 140 and retrieves the identification information of the traced parcel.

This embodiment is the same as the embodiment shown in FIG. 1 except that the read instruction is not issued by the server 10 directly to the radio tag readers/writers 14-1 to 14-4 at the time of retrieval of the traced parcel, but the read information of the stored passage tags is read out to retrieve the identification information of the traced parcel.

Also the selection processing of using the entry time of the parcel tracing request by the parcel retrieving unit 140 as the current time, and selecting the radio tag reader/writer reading out the passage tag data file from the scheduled arrival time at the corresponding course point, any of the selecting processes (1), (2) and (3) above may be applied as in the embodiment shown in FIG. 1.

Figure 15A:
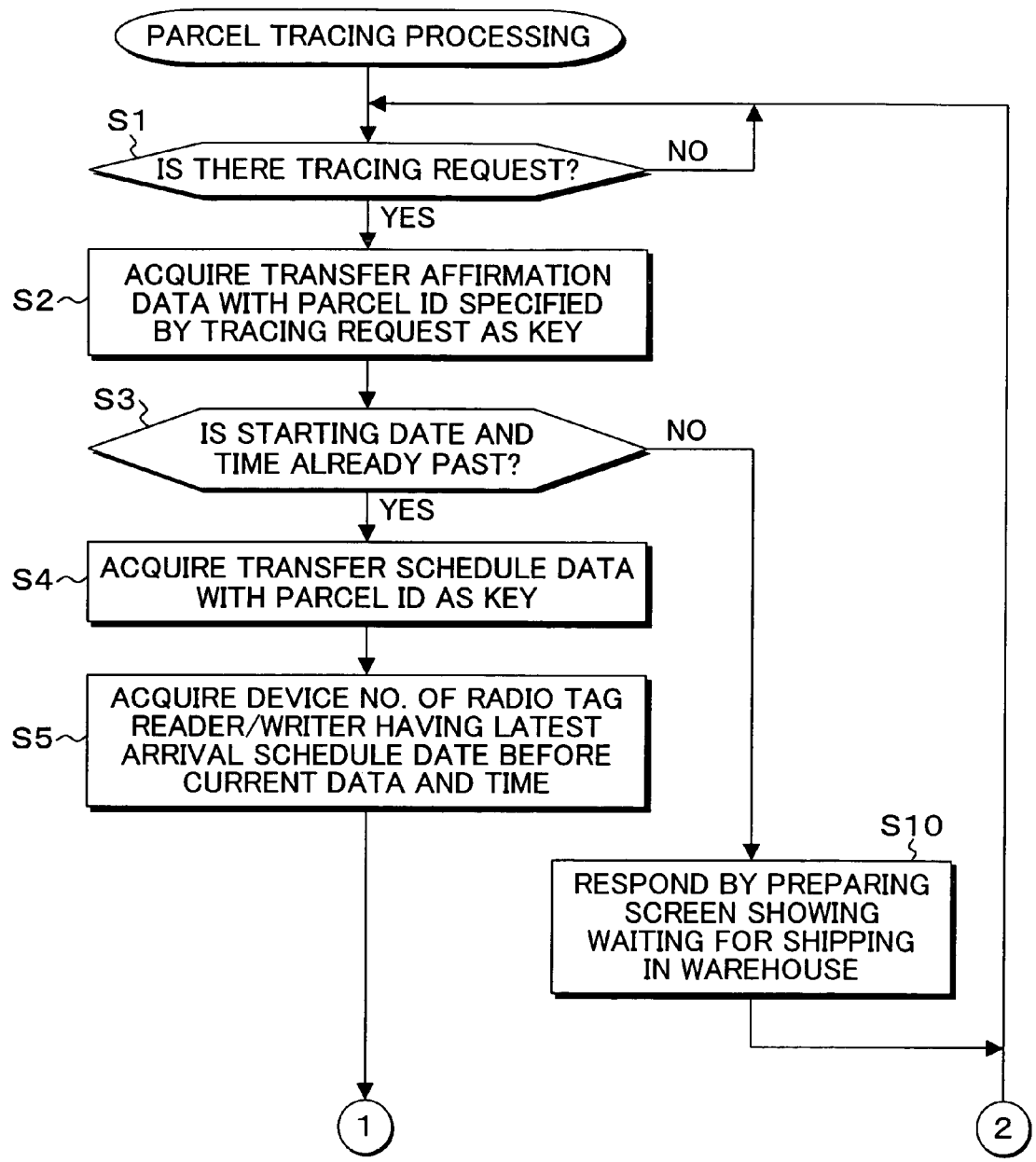
FIGS. 15A and 15B are flowcharts of the parcel tracing processing of the present invention based on the server shown in FIG. 14.
Figure 15B:
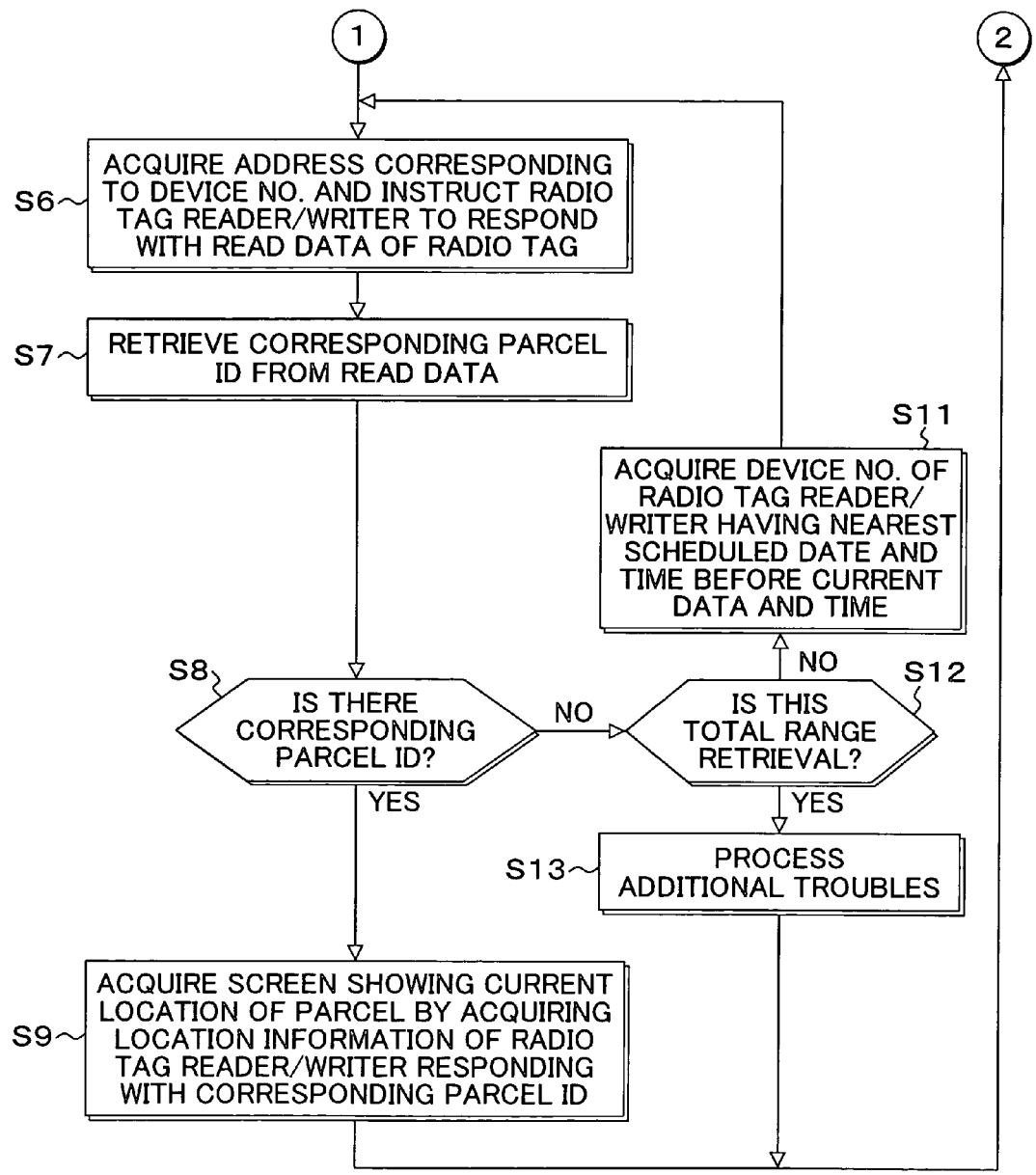

FIGS. 15A and 15B are flowcharts of the parcel tracing processing of the present invention by the server shown in FIG. 14. The selection of a radio tag reader/writer for reading out the passage tag data file is described by means of a case where a radio tag reader/writer installed at a course point having the scheduled arrival time earlier than and the closest to the tracing request entry time (current time) 100 shown in FIG. 11 is selected.

In FIGS. 15A and 15B, upon receipt of a tracing request from the user terminal in step S1, transfer affirmation data is acquired in step S2 from the transfer affirmation data file 32 with the parcel ID specified in the tracing request as a key. In step S3, it is checked whether or not the departure date contained in the transfer affirmation date is past the current date.

If the current date is before the departure date, the process advances to step S10, and a screen showing waiting for issue from warehouse is displayed for response. If the current date is past the departure date, the transfer schedule data is obtained in step S4 from the transfer schedule data file 36 with the parcel ID as a key. In step S5, the device number of the radio tag reader/writer having a past scheduled arrival date the closest to the current date is acquired.

Then in step S6, a communication address corresponding to the device number is acquired. Responding of the read data of the radio tag stored in the radio tag reader/writer to be covered via the internet is instructed. In step S7, retrieving processing of the corresponding parcel ID is performed from the read data. When the corresponding parcel ID is determined in step S8, the location information of the radio tag reader/writer having responded the corresponding parcel ID is acquired in step S9, and a screen showing the current position of the parcel is sent to the user terminal.

On the other hand, when the corresponding parcel ID is not found in step S8, it is checked in step S12 whether or not retrieval has been completed with the scheduled arrival dates before the current date as the total range. If completed, the device number of the radio tag reader/writer having a past scheduled arrival date the next closest to the current date is acquired in step S11, and the stored data is read out from the corresponding radio tag reader/writer in steps S6, S7 and S8, and the corresponding parcel ID is determined.

If retrieval with the scheduled arrival times before the current time as the total range has not permitted retrieval of the corresponding parcel ID in step S12, a tracing trouble processing would be carried out in step S13.

The present invention provides a program for conducting the parcel tracing processing to be executed by the server 10 shown in FIG. 1 or FIG. 14. In the embodiment shown in FIG. 1, the parcel tracing processing shown in the flowcharts of FIGS. 13A and 13B corresponds to the program processing procedure. In the embodiment shown in FIG. 14, the flowchart of the parcel tracing processing corresponds to the processing procedure of the program.

The present invention includes appropriate variations not impairing the object and advantages thereof, and is not limited by the numerical values shown in the above-mentioned embodiments.

The features of the present invention may be listed as follows:

The invention claimed is:

1. A parcel tracing system comprising:
   a user terminal of a client who requests delivery of a parcel, the user terminal having an internet communication function;
   a radio tag which is attached to the parcel and into which identification information of said parcel is written;
   a plurality of radio tag readers which are arranged on a distribution route and have an internet communication function; and
   a server which has an internet communication function, the server including:
   an arrival scheduling unit which prepares and registers a transfer schedule data file which stores scheduled arrival date for the parcel in each tag communicable area of the radio tag readers; and
   a parcel retrieving unit which, upon receipt of a parcel tracing request specifying identification information of the parcel from the user terminal, selects radio tag reader, which has a scheduled arrival date corresponding to the current date with reference to the scheduled arrival date of the parcel with the identification information of the transfer schedule data file, instructs the selected radio tag reader to read out information regarding the radio tag, and responds to the user terminal the current position of the parcel by obtaining identification information of the traced parcel from the result of reading of the radio tag returned from the selected radio tag reader, wherein said parcel retrieving unit instructs said radio tag readers having a scheduled arrival date the closest to the current date when the tracing request is received to read information regarding said radio tag, thereby obtaining the identification information of the traced parcel.

2. The parcel tracing system according to claim 1, wherein said parcel retrieving unit selects a plurality of said radio tag readers having past scheduled arrival dates close to the current date for which a tracing request is received in the order of closer to more distant ones to instruct them to read out information regarding said radio tag, thereby obtaining the identification information of the traced parcel.

3. The parcel tracing system according to claim 2, wherein, when the identification information of the traced parcel cannot be determined from the result of reading said radio tag readers, said parcel retrieving unit instructs said radio tag reader having an earlier scheduled arrival time to read information regarding said radio tag, thereby determining the identification information of the traced parcel.

4. A parcel tracing method of a distribution system having a user terminal of a client who requests delivery of a parcel, the user terminal having an internet communication function, a radio tag which is attached to a parcel and into which identification information of a parcel is written, a plurality of a radio tag readers which are arranged on a distribution route and have a communication function, and a server which has an internet communication function, the server comprising:
   an arrival scheduling step of preparing and registering a transfer schedule data file which stored scheduled arrival date when the parcel arrives at each tag communicable area of said radio tag readers; and
   a parcel retrieving step of selecting, upon receipt of a parcel tracing request specifying identification information of the parcel from the user terminal, radio tag reader having a scheduled arrival date corresponding to the current date with reference to the scheduled arrival date of the parcel with the identification information of the transfer schedule data file, instructing the selected radio tag reader to read out the radio tag, and responding to the user terminal the current position of the parcel by determining the identification information of the traced parcel from the result of reading of the radio tag returned from said selected radio tag reader,
   wherein said parcel retrieving step instructs said radio tag readers having a scheduled arrival date the closest to the current date when the tracing request is received to read information regarding said radio tag, thereby obtaining the identification information of the traced parcel.

5. A computer-readable medium encoded with a computer program allowing a computer to operate as a server connected via the internet to a plurality of radio tag readers, which is arranged on a distribution route, reading the identification information of a parcel written in a radio tag attached to the parcel and a user terminal of a client who requests delivery of a parcel, the program causing the computer to execute:
   an arrival scheduling step of holding in an arrival scheduling unit a scheduled arrival date when the parcel arrives at each tag communicable area of said radio tag readers; and
   a parcel retrieving step of selecting, upon receipt of a parcel tracing request specifying identification information of the parcel from the user terminal, radio tag reader having a scheduled arrival date corresponding to the current date with reference to the scheduled arrival date of the parcel with the identification information held in said arrival scheduling unit, instructing the selected radio tag reader to read said radio tag, and responding to the user terminal the current position of the parcel by determining the identification information of the traced parcel from the result of reading of the radio tag returned from said selected radio tag reader, wherein said parcel retrieving step instructs said radio tag readers having a scheduled arrival date the closest to the current date when the tracing request is received to read information regarding said radio tag, thereby obtaining the identification information of the traced parcel.

* * * * *